US008144589B2

(12) United States Patent
Meylan et al.

(10) Patent No.: US 8,144,589 B2
(45) Date of Patent: Mar. 27, 2012

(54) LEARNING-BASED SEMI-PERSISTENT SCHEDULING IN WIRELESS COMMUNICATIONS

(75) Inventors: Arnaud Meylan, San Diego, CA (US); Aleksandar Damnjanovic, Del Mar, CA (US); Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 954 days.

(21) Appl. No.: 12/116,146

(22) Filed: May 6, 2008

(65) Prior Publication Data
US 2009/0003282 A1 Jan. 1, 2009

Related U.S. Application Data

(60) Provisional application No. 60/916,517, filed on May 7, 2007.

(51) Int. Cl.
*G08C 15/00* (2006.01)
(52) U.S. Cl. ........................................ 370/235; 370/230
(58) Field of Classification Search .................. 370/230, 370/230.1, 231–235, 238, 328–329, 389, 370/392, 395.4, 395.41–395.43, 428–429, 370/468
See application file for complete search history.

(56) References Cited

U.S. PATENT DOCUMENTS

| | | | | |
|---|---|---|---|---|
| 5,790,538 A * | 8/1998 | Sugar | ............................ | 370/352 |
| 5,812,554 A * | 9/1998 | Kadambi et al. | ............... | 370/473 |
| 7,369,491 B1 * | 5/2008 | Beshai et al. | .................. | 370/230 |
| 7,630,320 B2 * | 12/2009 | Zhang et al. | .................. | 370/252 |
| 7,817,543 B2 * | 10/2010 | Beshai et al. | ................. | 370/230 |
| 7,835,277 B2 * | 11/2010 | Kim et al. | ...................... | 370/230 |
| 2006/0095944 A1 * | 5/2006 | Demircin et al. | ............... | 725/81 |
| 2006/0120282 A1 | 6/2006 | Carlson et al. | | |
| 2006/0153216 A1 | 7/2006 | Hosein et al. | | |
| 2006/0256719 A1 * | 11/2006 | Hsu et al. | ...................... | 370/230 |
| 2007/0153916 A1 * | 7/2007 | Demircin et al. | ........ | 375/240.26 |
| 2009/0245246 A1 * | 10/2009 | Veeragandham et al. | .... | 370/389 |

FOREIGN PATENT DOCUMENTS

| | | |
|---|---|---|
| RU | 2263415 | 10/2005 |
| WO | WO 0130103 A1 | 4/2001 |
| WO | WO 03051076 | 6/2003 |
| WO | WO 2006012405 A2 | 2/2006 |
| WO | 2008024890 | 2/2008 |

OTHER PUBLICATIONS

International Search Report, PCT/US08/062960, International Search Authority, European Patent Office, Oct. 29, 2008.
Written Opinion, PCT/US08/062960, International Search Authority, European Patent Office, Oct. 29, 2008.
Ericsson, "R2-062859: Semi Persistent Scheduling," Oct. 2006. pages 1-15, Internet Citation, XP002496512.

* cited by examiner

*Primary Examiner* — Chi H. Pham
*Assistant Examiner* — Kevin Mew
(74) *Attorney, Agent, or Firm* — Milan I. Patel; Nerrie M. Zohn

(57) ABSTRACT

Systems and methods are provided for a learning-based determination of semi-persistent scheduling of data-packet flow wireless communication. A packetized data flow served to a wireless terminal is fully scheduled for an initial period of time in order to collect statistics associated with scheduled packet sizes (Ss) and inter-packet times (Ts). Analysis of a cumulative distribution of {S, T} pairs indicate whether a characteristic packet size ($S_0$) and size dispersion ($D_0$) are associated with the cumulative distribution. Inter-time intervals associated with the characteristic size and dispersion complete a transport format. Semi-persistent scheduling is utilized for a packetized flow when a characteristic transport format can be extracted, or learned, from the accumulated statistics. Extracted transport formats can be employed to optimize scheduling efficiency upon handover.

46 Claims, 11 Drawing Sheets

LEARNING-BASED SEMI-PERSISTENT SCHEDULING IN WIRELESS COMMUNICATIONS

CLAIM OF PRIORITY UNDER 35 U.S.C. §119

This Application for Patent claims the benefit of U.S. Provisional Application Ser. No. 60/916,517 filed on May 7, 2007, and entitled "A METHOD AND APPARATUS FOR PERSISTENT SCHEDULING." The entirety of this application is expressly incorporated herein by reference.

BACKGROUND

1. Field

The subject disclosure relates generally to wireless communication and, more particularly, to a learning approach to establishing, and utilizing, a persistent scheduling in a data-packet based wireless communication.

2. Background

Wireless communication systems are widely deployed to provide various types of communication content such as voice, video, data, and so on. These systems may be multiple-access systems capable of supporting simultaneous communication of multiple terminals with one or more base stations. Multiple-access communication relies on sharing available system resources (e.g., bandwidth and transmit power). Examples of multiple-access systems include code division multiple access (CDMA) systems, time division multiple access (TDMA) systems, frequency division multiple access (FDMA) systems, and orthogonal frequency division multiple access (OFDMA) systems.

Communication between a terminal in a wireless system (e.g., a multiple-access system) and a base station is effected through transmissions over a wireless link comprised of a forward link and a reverse link. Such communication link may be established via a single-input-single-output (SISO), multiple-input-single-output (MISO), or a multiple-input-multiple-output (MIMO) system. A MIMO system consists of transmitter(s) and receiver(s) equipped, respectively, with multiple ($N_T$) transmit antennas and multiple ($N_R$) receive antennas for data transmission. SISO and MISO systems are particular instances of a MIMO system. A MIMO channel formed by $N_T$ transmit and $N_R$ receive antennas may be decomposed into $N_v$ independent channels, which are also referred to as spatial channels, where $N_v \leq \min\{N_T, N_R\}$. Each of the $N_v$ independent channels corresponds to a dimension. The MIMO system can provide improved performance (e.g., higher throughput, greater capacity, or improved reliability) if the additional dimensionalities created by the multiple transmit and receive antennas are utilized.

Regardless the peculiarities of the many available wireless communication systems, efficient scheduling is necessary to maintain or exceed a planned quality of service, or optimize sector/cell performance. Scheduling strategies that result in reducing communication overhead typically associated with control signaling are conduits to efficient scheduling. Other scheduling strategies, such as those based on communication heuristics can also lead to effective scheduling. Such scheduling strategies, however, generally fail to adapt to rapidly changing communication environments wherein multiple data flows are granted and revoked periodically. Therefore, there is a need in the art for efficient scheduling techniques that are versatile to substantial variations in traffic flow.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

The subject innovation provides systems and methods for a learning-based determination of persistent scheduling of data-packet flow(s) in wireless communication. A packetized data flow served to a wireless terminal is fully scheduled for an initial period of time in order to collect statistics associated with scheduled packet sizes (Ss) and inter-packet times (Ts). Analysis of a cumulative distribution of scheduled $\{S, T\}$ pairs indicate whether a characteristic packet size ($S_0$) and size dispersion ($D_0$) are associated with the cumulative distribution. Inter-time intervals associated with the characteristic size and dispersion lead to a selection of a transport format. Semi-persistent scheduling is utilized for a packetized flow when a characteristic transport format can be extracted from the accumulated statistics. Extracted transport formats can be employed to optimize scheduling efficiency upon handover.

In an aspect, the subject innovation describes a method comprising: scheduling in full a packet flow during a specific period of time; collecting accumulation statistics of scheduled packet sizes (Ss) and inter-packet time intervals (Ts); and identifying a set of peaks of highest accumulation; when a number of $\{S, T\}$ pairs contained within a tolerance size (D) of the peak is above a threshold, utilizing semi-persistent scheduling.

In another aspect, an apparatus that operates in a wireless communication system is disclosed, the apparatus comprising: a processor configured to schedule in full a packet flow; to generate an accumulation distribution of scheduled packet sizes (Ss) and inter-packet time intervals (Ts); and when a number of $\{S, T\}$ pairs contained within a tolerance size (D) of a peak in the accumulation distribution is above a threshold, to implement semi-persistent scheduling; and a memory coupled to the processor.

In yet another aspect, the subject innovation discloses a wireless communication device comprising: means for accumulating distribution of fully scheduled packet sizes (Ss) and inter-packet time intervals (Ts); means for utilizing semi-persistent scheduling when a number of $\{S, T\}$ pairs contained within a tolerance size (D) of a peak in the accumulation distribution is above a threshold; and means for utilizing semi-persistent scheduling when the accumulation statistics match a known statistics for data packets generated by a packet-flow generator, utilizing semi-persistent scheduling.

In a further aspect, the subject innovation describes a computer program product including a computer-readable medium comprising: code for causing a computer to schedule in full a packet flow; code for causing a computer to collect accumulation statistics over a specific period of time of fully scheduled packet sizes (Ss) and inter-packet time intervals (Ts); code for causing a computer to identify a set of peaks of highest accumulation; and code for causing a computer to implement semi-persistent scheduling when a number of $\{S, T\}$ pairs contained within a tolerance size (D) of the peak is above a threshold.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
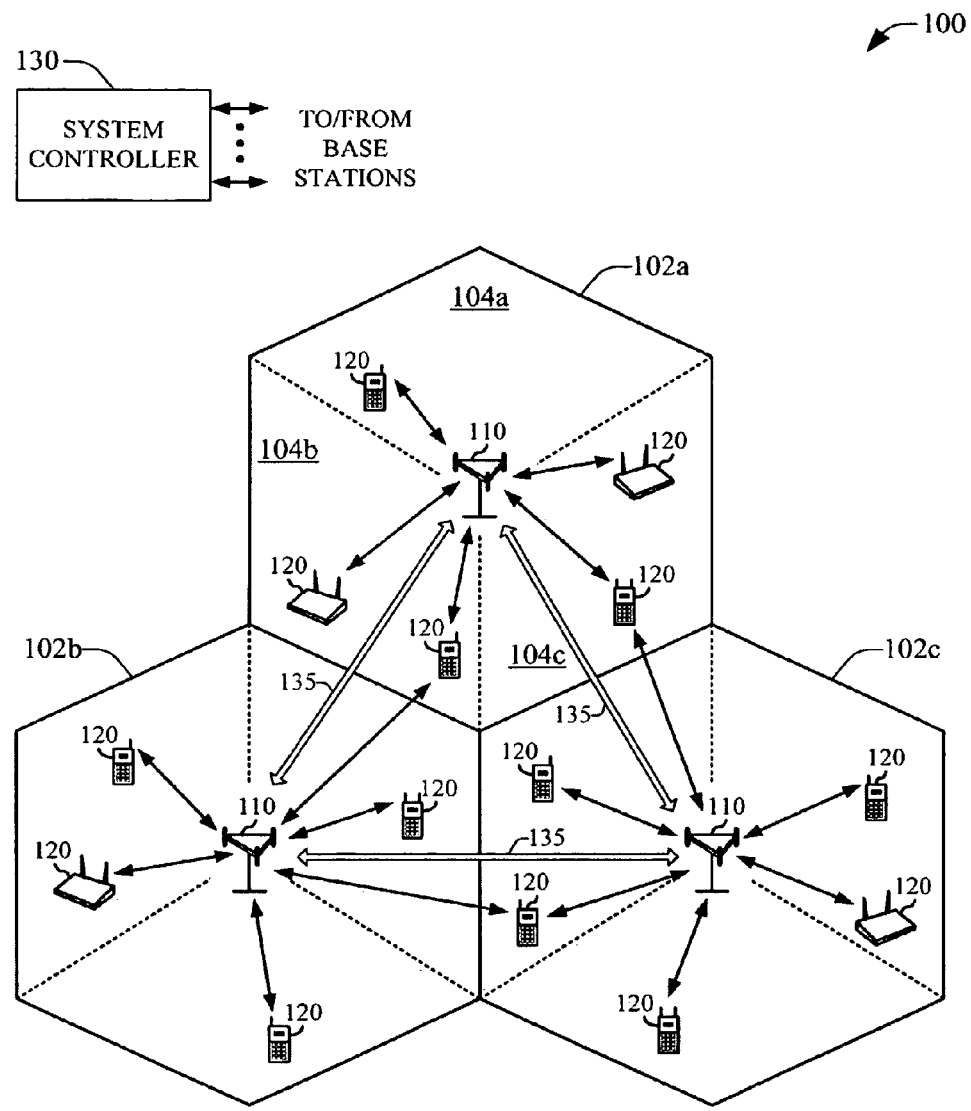
FIG. 1 illustrates an example wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "system," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various embodiments are described herein in connection with a wireless terminal. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, a mobile station, a mobile terminal, a mobile, a remote station, an access point, a remote terminal, an access terminal, a user terminal, a user agent, a user device, customer premises equipment, user equipment, a wireless device, a cellular telephone, a PCS telephone, a cordless telephone, a session initiation protocol (SIP) phone, a wireless local loop (WLL) station, a handheld device having wireless connection capability, or other processing device connected to a wireless modem.

In addition, various embodiments disclosed in the subject specification relate to a base station. A base station may refer to a device in an access network that communicates over the air-interface, through one or more sectors, with wireless terminals, and with other base stations through backhaul wired or wireless network communication. The base station may act as a router between the wireless terminal and the rest of the access network; which may include an IP (internet protocol) packet-switched network, by switching received air-interface frames to IP packets. The base station also coordinates management of attributes for the air interface. A base station may also be referred to as an access point (AP), Node B, evolved Node B (eNodeB), evolved base station (eBS), access network (AN) or some other terminology.

Referring now to the drawings, FIG. 1 is an illustration of a wireless multiple-access communication system 100 in accordance with various aspects described herein. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the terms "sector" or "cell" can refer to a BTS and/or its coverage area depending on the context in which the term is used. In one example, sectors 104a, 104b, 104c in a cell 102a, 102b, 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be any of the devices mentioned above. Further, a terminal 120 can communicate with any number of base stations 110 or no base stations 110 at any given instant.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. Backhaul wired or wireless network communication 135 can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes, Gold codes, Kasami codes, pseudonoise codes) even though they are sent in the same time interval or frequency subcarrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2A:
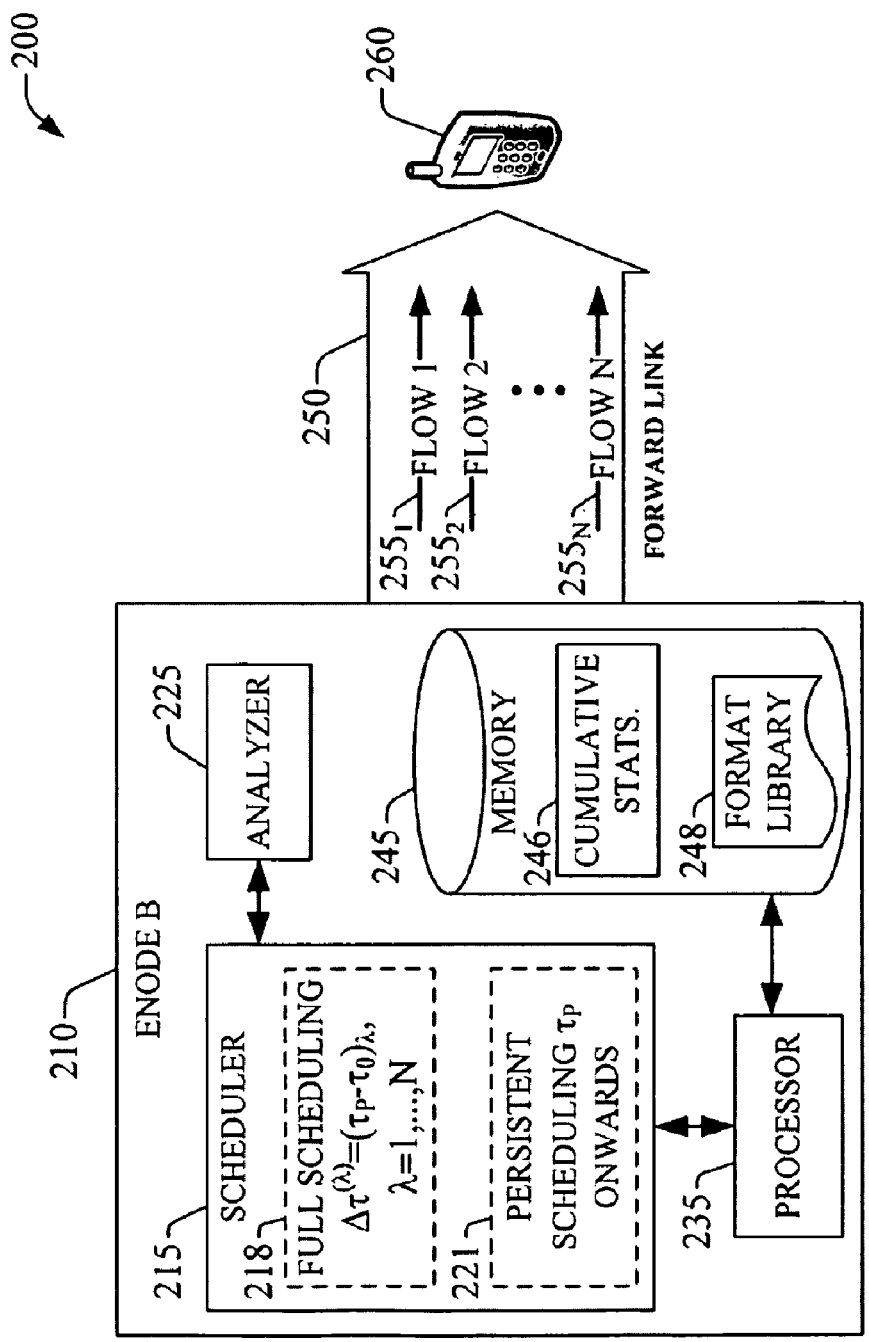
FIGS. 2A and 2B are block diagrams example systems that establish and utilize semi-persistent scheduling based on learned features of full scheduling of a communication data-packet flow according to aspects described in the subject specification.

FIG. 2A is a block diagram of a system 200 that establishes, and utilizes, semi-persistent scheduling based on learned features of full scheduling of a communication data-packet flow. A flow is typically established by a packet-based (e.g., internet protocol (IP)-packet based) network management component (e.g., network system controller 130). In evolved UTRAN (universal terrestrial radio access network), an evolved packet system (EPS) creates data-packet flows, which arrive via a wired or wireless network, or backhaul communication backbone, to a base station, or evolved Node B (eNode B) 210. In view of the packetized nature of a data flow, multiple flows (e.g., flows $255_1$-$255_N$) can be created for disparate instances of applications—e.g., voice, video and audio streaming, file transfers, web browsing—that generate data to be provided wirelessly, e.g., via a forward link 250, to a terminal 260 through eNode B 210, or from an eNode B to a terminal via a reverse link. Conventionally, a packet received at eNode B 210 for communication to a terminal 260 is associated with a label that characterizes the flow (e.g., guaranteed bit rate (GBR) type or non-GBR type) to which the packets belong to. Such label carries information associated with quality of service (QoS) parameters such as GBR, maximum bit rate (MBR), delay budget (e.g., fraction of data queued in eNode 210 per packet), traffic class and traffic handling priority, maximum loss rate, and so on. It should be appreciated that such label information may be common to all data flows, including those that are periodic or aperiodic burst-like flows, such as VoIP (voice over IP). In the subject innovation, to optimize scheduling of packet flows, eNode B 210 utilizes a learning approach that facilitates implementing a semi-persistent scheduling—a characteristic resource grant is continually allocated without control signaling until revoked without control signaling—when appropriate according to the characteristics of a data-packet stream (e.g., flow $255_1$). It is to be noted that semi-persistent scheduling is an effective mode of resource allocation that does not requires control channel(s) operation and generally is well suited for data flows wherein data payload is smaller or comparable to overhead incurred by overhead signaling. For example, in a VoIP quasi-periodic flow, it is common to allocate of the order of 50 bits to signal a payload of 50 bytes or less, such overhead can be detrimental to communication if utilized repeatedly for allocating resources for the VoIP flow.

To ensure an optimal scheduling for data flows that are adequate for semi-persistent scheduling, eNodeB 210 includes a scheduler 215 that allocates communication resources for a set of N (positive integer) data flows ($255_1$-$255_N$) created by an EPS in a fully scheduled mode 218, wherein resources are granted according to specific queue sizes (e.g., volume of information to be conveyed over to terminal 260), label information associated with each flow, in addition to channel quality conditions, cell/sector load, available bandwidth and power density, antenna configuration at base station (e.g., eNode B 210) and terminal (e.g., mobile 260), and the like. Typically, scheduler 215 utilizes algorithms such as round robin, fair queuing, maximum throughput, proportional fairness, etc. to determine packet formats, code rate, constellation size, allocated subcarriers, power/ power density, and so forth. Full scheduling of flows $255_1$-$255_N$ proceeds for a period of time $\Delta\tau^{(\lambda)} = (\tau_P - \tau_0)_\lambda$, $\lambda = 1, 2, \ldots N$. Generally, $\Delta\tau^{(\lambda)}$ can be configured statically, irrespective of specifics of data flow (e.g., $255_1$), in order to span several (e.g., a few hundred) packet frames; such time interval can be determined from a generation rate associated with a packet frame generation engine (not shown) for a selected type of flow (for example, VoIP embodied in flow $255_N$). Alternatively, or in addition, $\Delta\tau^{(\lambda)}$ can be adjusted specifically to each flow $255_1$-$255_N$ based on information available on label(s) generated by the EPS bearer establishing the flow. As a further alternatively, or in further addition, $\Delta\tau^{(\lambda)}$ can be dynamically adjusted, so as to span a time interval that ends once scheduler 215 identifies a flow (e.g., flow $255_1$) that can benefit from semi-persistent scheduling with a high probability.

During fully scheduled operation, an analyzer 225 monitors each flow $255_1$-$255_N$ and records associated packet sizes and inter-packet time intervals, and collects, and stores in memory 245, cumulative statistics 246 related to such resource grants. For quasi-periodic or bursty flows, analyzer 225 extracts typical transport formats comprising a packet size and inter-packet interval appropriate for semi-persistent scheduling. Such information is conveyed to scheduler 215, which starts semi-persistent scheduling 221 for such flow from $\tau_P$ onwards. In addition, extracted, or learned, formats are stored in a format library, or registry, in memory 245. For flows that exhibit statistics incompatible with semi-persistent scheduling, analyzer 225 indicates (e.g., via an M-bit word, with M a positive integer, that conveys a flow identification and a control bit) to scheduler 215 to proceed with full scheduling. Evaluation of suitability for semi-persistent scheduling 221 can be performed on a per-flow basis, or jointly on a per-terminal (e.g., mobile 260) basis.

To process cumulative statistics, analyzer 225 can reason or draw conclusions about, e.g., infer, suitable transport formats based at least in part on generated cumulative statistics 246. To infer such formats, analyzer 225 can rely on artificial intelligence techniques, which apply advanced mathematical algorithms—e.g., decision trees, neural networks, regression analysis, principal component analysis (PCA) for feature and pattern extraction, cluster analysis, genetic algorithm, and reinforced learning—to a set of available cumulative statistics 246.

In particular, the intelligent component 158 can employ one of numerous methodologies for learning from data and then drawing inferences from the models so constructed, e.g., Hidden Markov Models (HMMs) and related prototypical dependency models, more general probabilistic graphical models, such as Dempster-Shafer networks and Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The foregoing methods can be applied to analysis of allocated, or granted, communication resources, to extract suitable transport formats.

In addition, analyzer 225 can utilize a data miner (not shown) to further extract information from accumulated statistics 246 through data segmentation, computation of momenta of distribution of pairs {S, T}, model development of full scheduling patterns, e.g., predicting communication resources demand and allocation for a specific type of data flow, and related model evaluation(s). Such modeling can facilitate reducing the time interval $\Delta\tau^{(\lambda)}$ that scheduler 215 utilized full scheduling 218 to generate reliable statistics.

It should be appreciated that in embodiment 200, processor 235 is configured to carry out all operations that confer scheduler 215 and analyzer 225 their functionality as described above. It is to be noted that while scheduler 215, processor 235, and analyzer 225 are illustrated as separated components, such components can be consolidated into a single functional component that schedules packet flows, collects and analyzes statistics of communication grants (e.g., {S, T} pairs), and carries all necessary operations and computation through processor 235. In addition to storing cumulative statistics 246 and a transport format library 248 for multiple flows, memory 225 can store code instructions/modules and data structures, as well as code instructions for carried out by processor 235 in connection with scheduling data packets and analyzing statistics associated with such scheduling. Moreover, code instructions necessary for processor 235 to carry other functionalities of eNode B such as conveying data-packet flows $255_1$-$255_N$ over a forward link 250 can also be stored in memory 245.

Figure 2B:
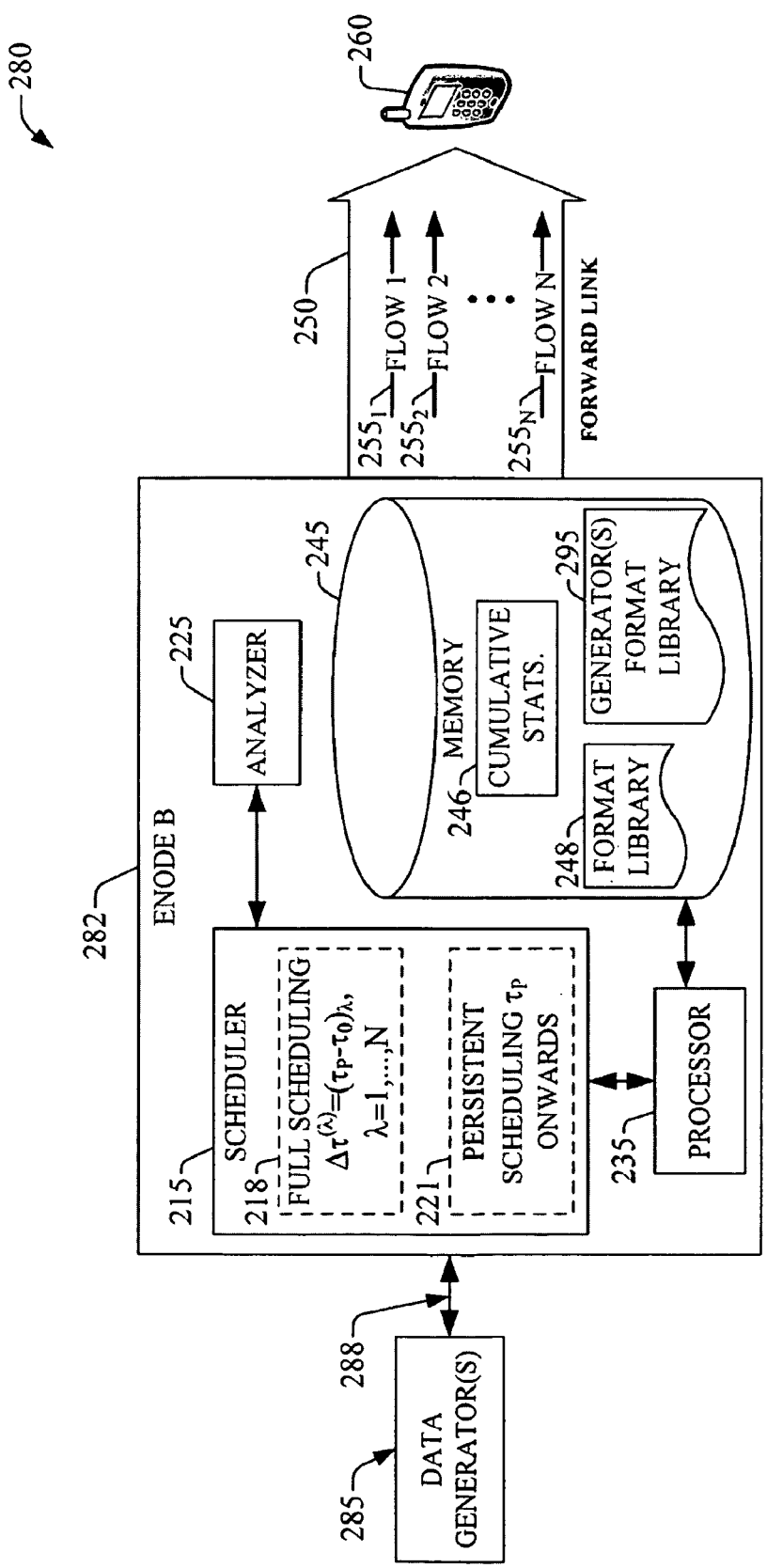

FIG. 2B is a block diagram of an example system 280 that establishes, and utilizes, semi-persistent scheduling based on learned features of full scheduling of a communication data-packet flow. Example system 280 comprises data generator(s) component 285 (in the subject description the terms data generator(s) 285 are also employed to refer to component 285) that conveys packetized data stream(s) 288 to eNode B 210. ENode B 282 comprises substantially the same components as eNode B 210, such components are indicated with same numerals as in example system 200, and possesses substantially the same functionality of eNode B 210. In addition to such functionalities, eNode B 282 also includes a generator(s) format library 295, or "stream fingerprint" library, which contains a set of known statistics and transport format fingerprints associated with generator(s) (e.g., vocoder(s)) in data generator(s) 285 from which eNode B 282 can be configured to received data stream(s) 288. ENode B 282 schedules one or more flows (e.g., flows $255_1$-$255_N$), and collects cumulative statistics 246 in memory 245. From such statistics, transports formats are extracted, or learned, through analyzer 225, and stored in format library 248. Analyzer 225, which can reside within scheduler 225, compares cumulative statistics 246 and transport formats in format library 248 with available "stream fingerprints" stored in generator(s) format library 295. When accumulated statistics and/or extracted, or learned, transport formats match a known "stream fingerprint," scheduler 225 ceases to fully schedule a flow that exhibits matching fingerprints and initiates utilization of semi-persistent scheduling for said flow.

Figure 3A:
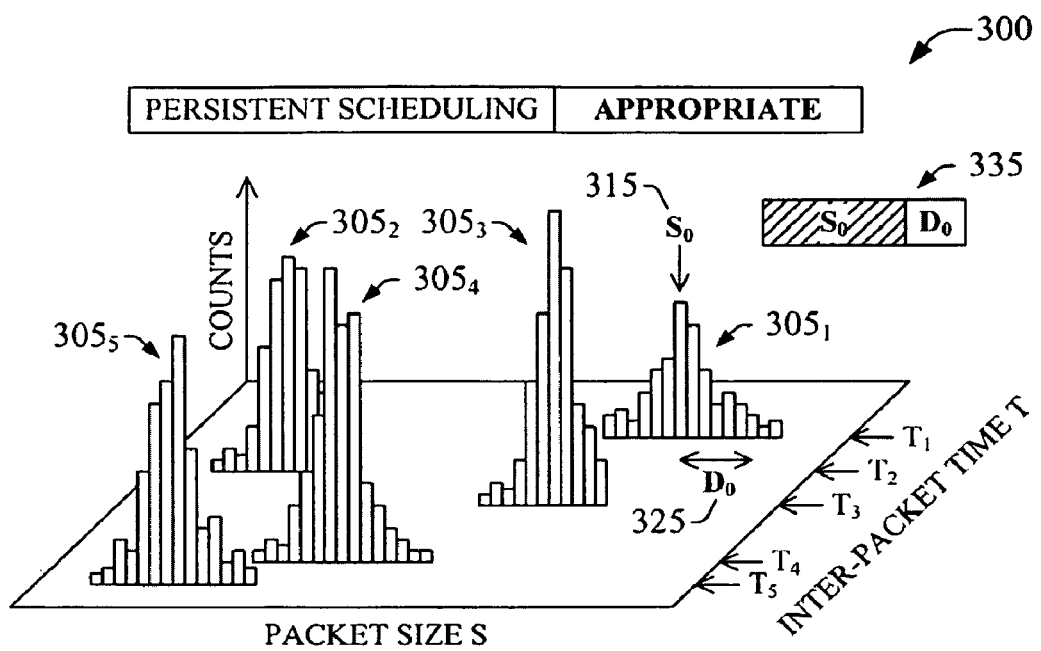
FIGS. 3A and 3B displays schematic diagrams of illustrative packet size-inter-packet time distributions.
Figure 3B:
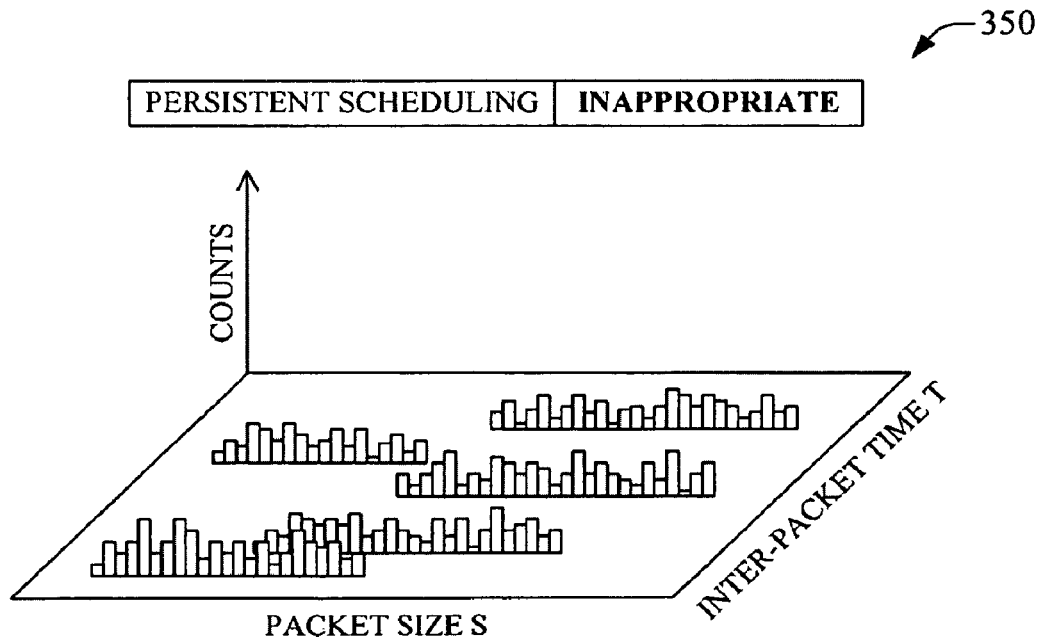

To illustrate cumulative statistics 246 and associated analysis, FIGS. 3A and 3B displays schematic diagrams 300 and 350 of illustrative {S, T} pair distributions. Diagram 300 illustrates distributions $305_1$-$305_5$ of scheduled packet sizes S and scheduled inter-pact time intervals T that arise from a cumulative statistics collected by analyzer 225 on a per-flow or per-terminal basis. Each of such distributions can correspond to a specific flow associated with a specific applications executed during communication with a terminal (e.g., terminal 260). In diagram 300, distributions are quasi-normal with a characteristic packet size, e.g., $S_0$ 315 for distribution $305_1$, and a characteristic half-width, e.g., $D_0$ 325. Parameters $S_0$ 315 and $D_0$ 325 can be extracted, or learned, (e.g., by analyzer 225) directly from the distribution of pairs {S, T} by computing the first and second momentum of said distribution. In view of the existence of such characteristic sizes, a typical packet size, e.g., 335 can be established for semi-persistent scheduling, as well as a typical inter-packet time, e.g., $T_1$ corresponding to 335. The typical packet format, e.g., 335, comprises a characteristic packet size, e.g., $S_0$ 315, and a tolerance, e.g., $D_0$ 325, which ensures a substantial percentage of data packets are adequately scheduled within semi-persistent scheduling.

It is to be noted that the larger the selected tolerance, e.g., D0 325, the larger the number the of data packets that can be accommodated through semi-persistent scheduling; however, the amount of padding in an actual scheduled packet increases with ensuing increase in overhead. In an aspect, analyzer 225 can infer a suitable tolerance, e.g., $D_0$ 325, based at least in part on cost-benefit analysis of a selected tolerance with respect to communication parameters like GBR, MBR, ABR (average bit rate), traffic class, traffic handling priority, cell/sector load, power density, available bandwidth, channel quality, etc. Such inference can results in dynamical changes to the packet format utilized for semi-persistent scheduling so as to ensure a desired quality of service, or a determined number of served terminals (e.g., a change in packet rate generation for a periodic flow, like a decrease from $\gamma_1$ (12.2 Kbits, for example) to $\gamma_2$ (9.6 Kbits, for example) can result in additional terminals being served at expense of reduced call quality.).

It is to be noted that distributions $305_1$-$305_5$ are illustrated in isochronous fashion; namely, each distribution $305_J$ (J=1, 2, 3, 4, 5) corresponds to pairs {S, T} with a definite time interval $T_J$. In a more general illustration, however, each distribution can present a dispersion around an average scheduled time interval $<T_J>$.

In FIG. 3B, diagram 350 illustrates an example cumulative statistics 246 that fails to be suited for semi-persistent scheduling. Namely, no characteristic packet sizes are identified and the distribution of {S, T} pairs fails to present a characteristic width. It is to be noted that momenta of distributions illustrated in 350 can be computed, yet, a Q-factor (e.g., computed by analyzer 225) associated with the distributions readily indicates that no characteristic size can be extracted, or learned.

Figure 4:
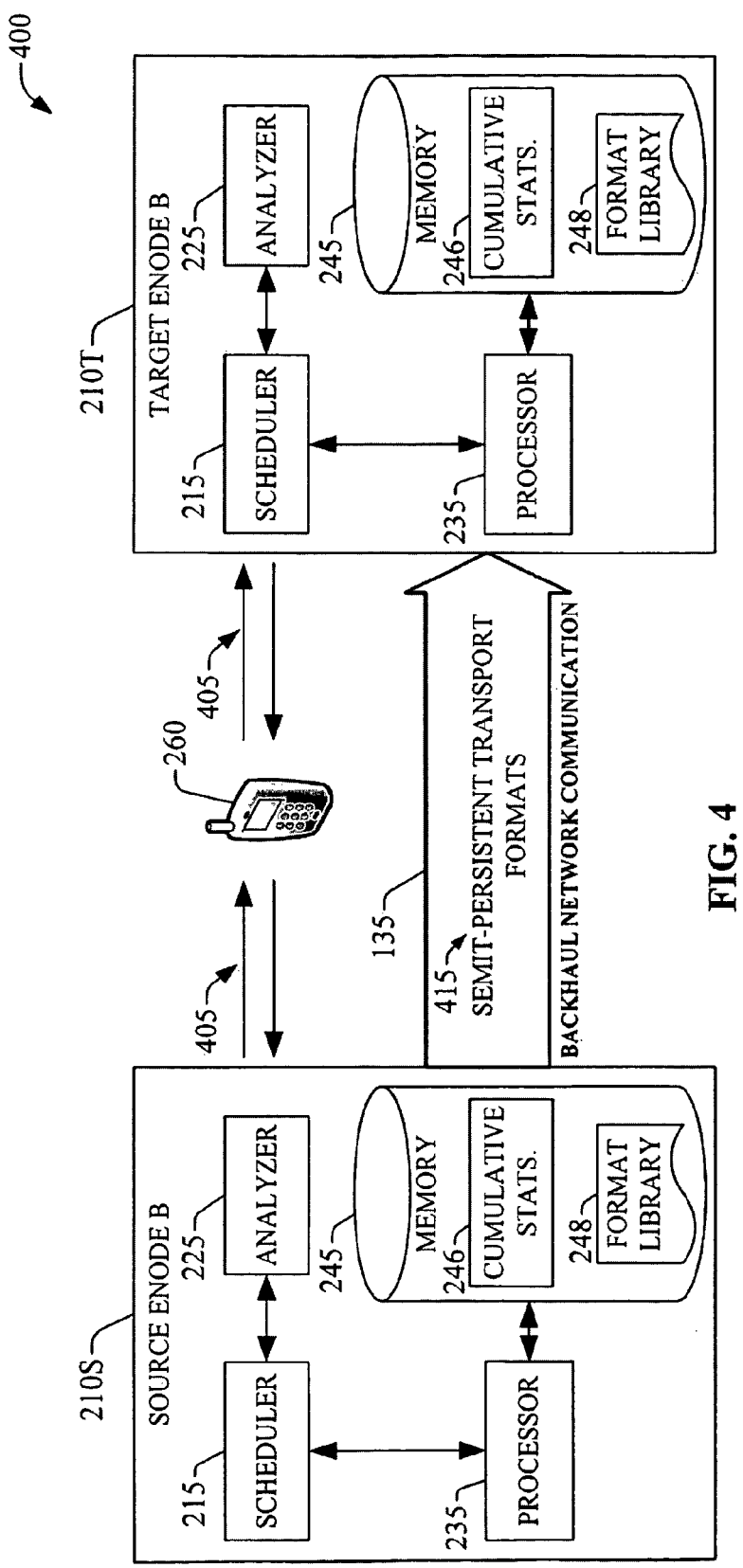
FIG. 4 illustrates a block diagram of an example system that exploits learned transport formats to improve scheduling upon handover in accordance to aspects disclosed herein.

FIG. 4 illustrates a block diagram of an example system 400 that exploits learned transport formats, e.g., stored in format library 248, to improve scheduling upon handover. In example system 400, a source eNode B 210S serves a terminal 260 through a wireless link 405 that conveys and receives a data-packet based communication scheduled within semi-persistent scheduling for a set of data flows (e.g., $255_1$-$255_N$) according to effective transport formats which can be stored in a format library 248. Source eNode B 210S has substantially the same functionality as eNode B 210 described above. Upon a determination of source eNode B 210S that terminal 260 is to be handed over to a target eNode B 210T, which has substantially the same functionality as eNode B 210S, a set of semi-persistent transport formats 415, stored in format library 248, can be conveyed to the target base station 210T. Conveying such transport formats 415 for the flows served to terminal 260, optimizes scheduling efficiency of target eNode B 210T by reducing $(\tau_P)_\lambda$ at the target cell. In an aspect, data formats are conveyed over backhaul network communication 135. In another aspect, such transports formats can be conveyed over a dedicated link from the source eNode B 210S to the target eNode B 210T. In yet another aspect, transports formats can be conveyed over wireless link 405 to the target eNode B 210T by terminal 260.

When source and target eNode Bs utilize disparate robust header compression (RoHC) schemes, reuse of learned transport formats for semi-persistent scheduling upon handoff can require adjustment of the packet formats according to RoHC profile implemented by the target eNode B 210T.

Figure 5A:
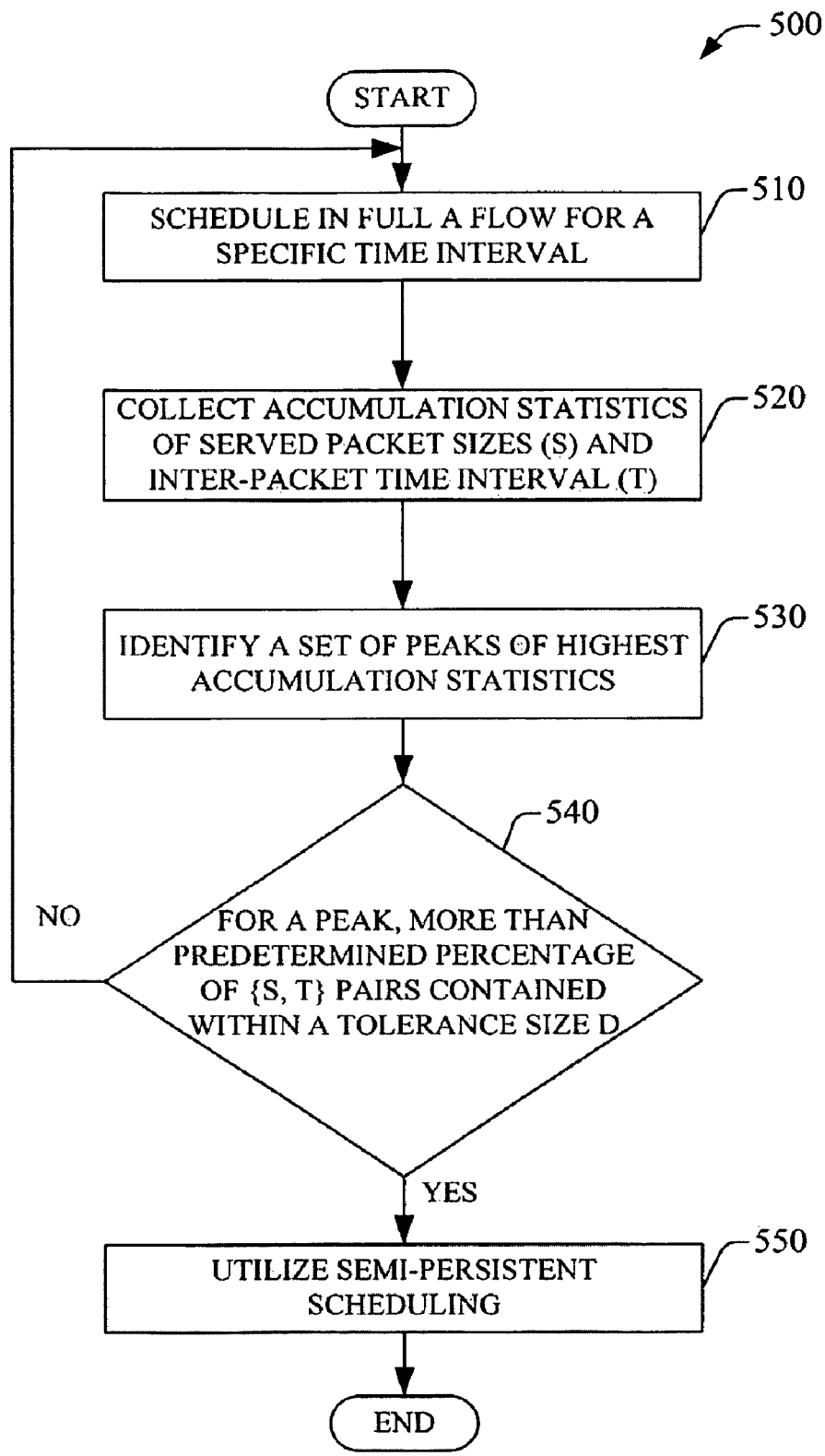
FIGS. 5A and 5B are flowcharts of example methods to establish, and utilize, semi-persistent scheduling according to aspects described in the subject specification.
Figure 5B:
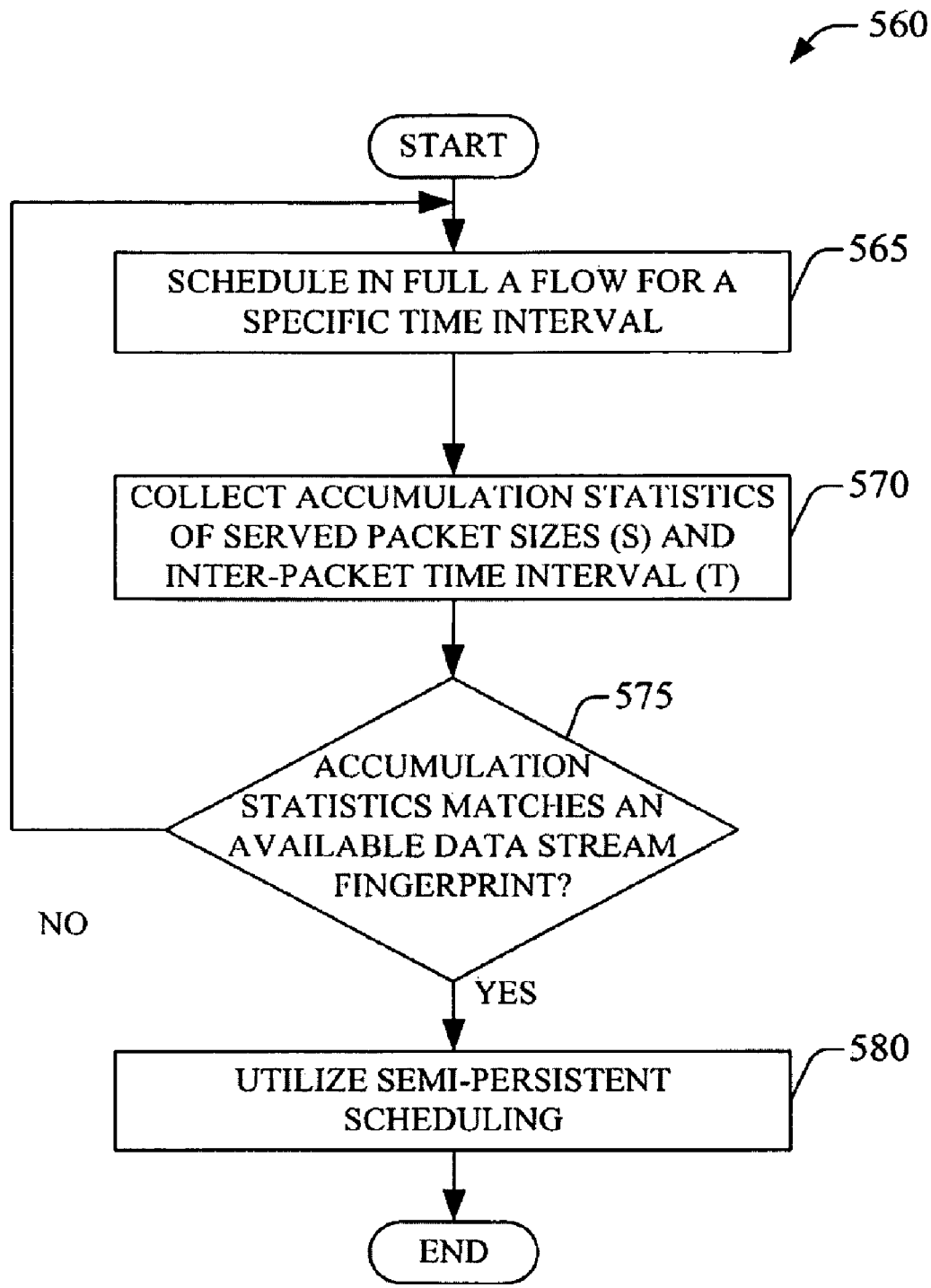
Figure 6:
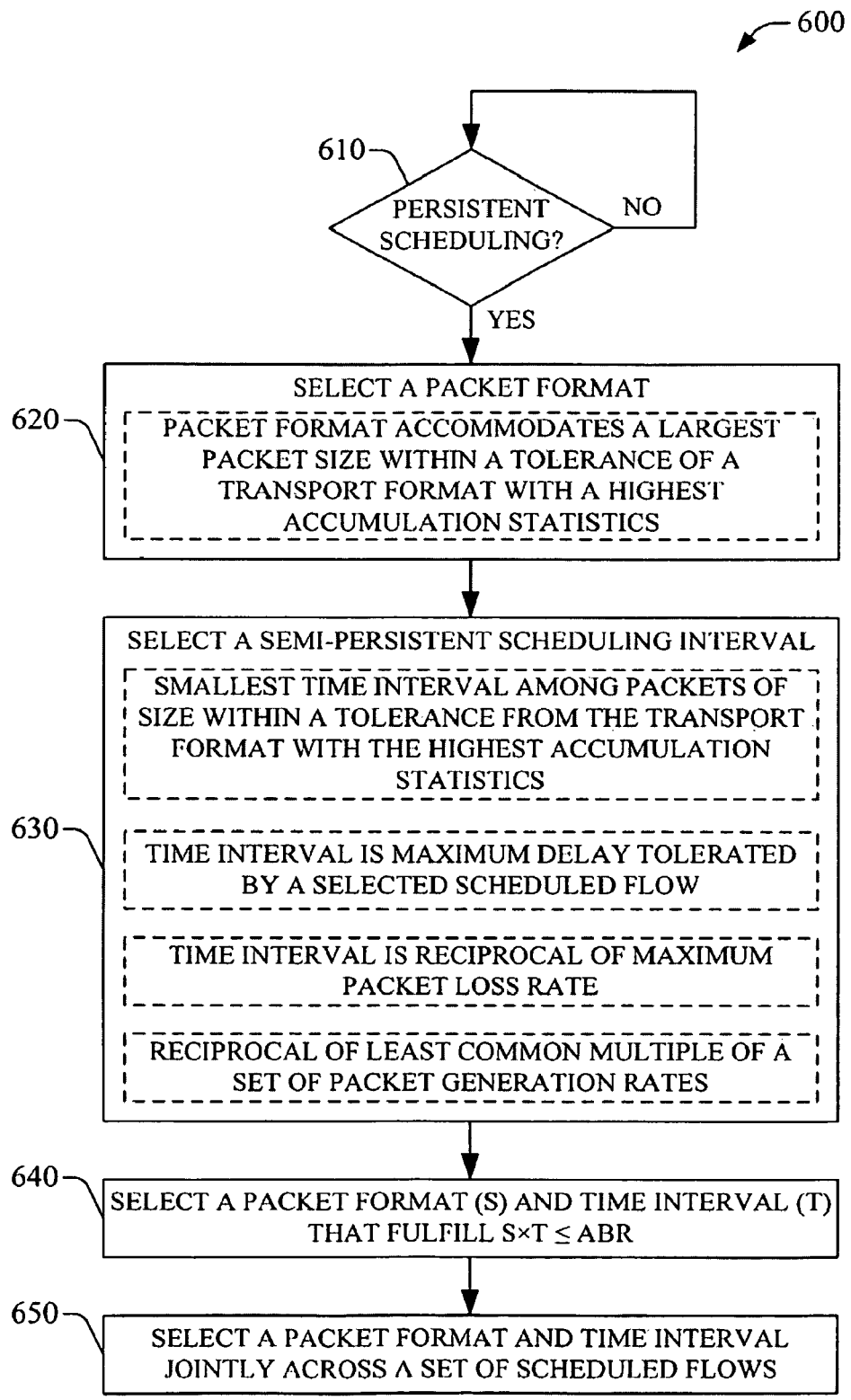
FIG. 6 is a flowchart of an example method for selecting transport formats suitable for semi-persistent scheduling according to aspects described herein.
Figure 7:
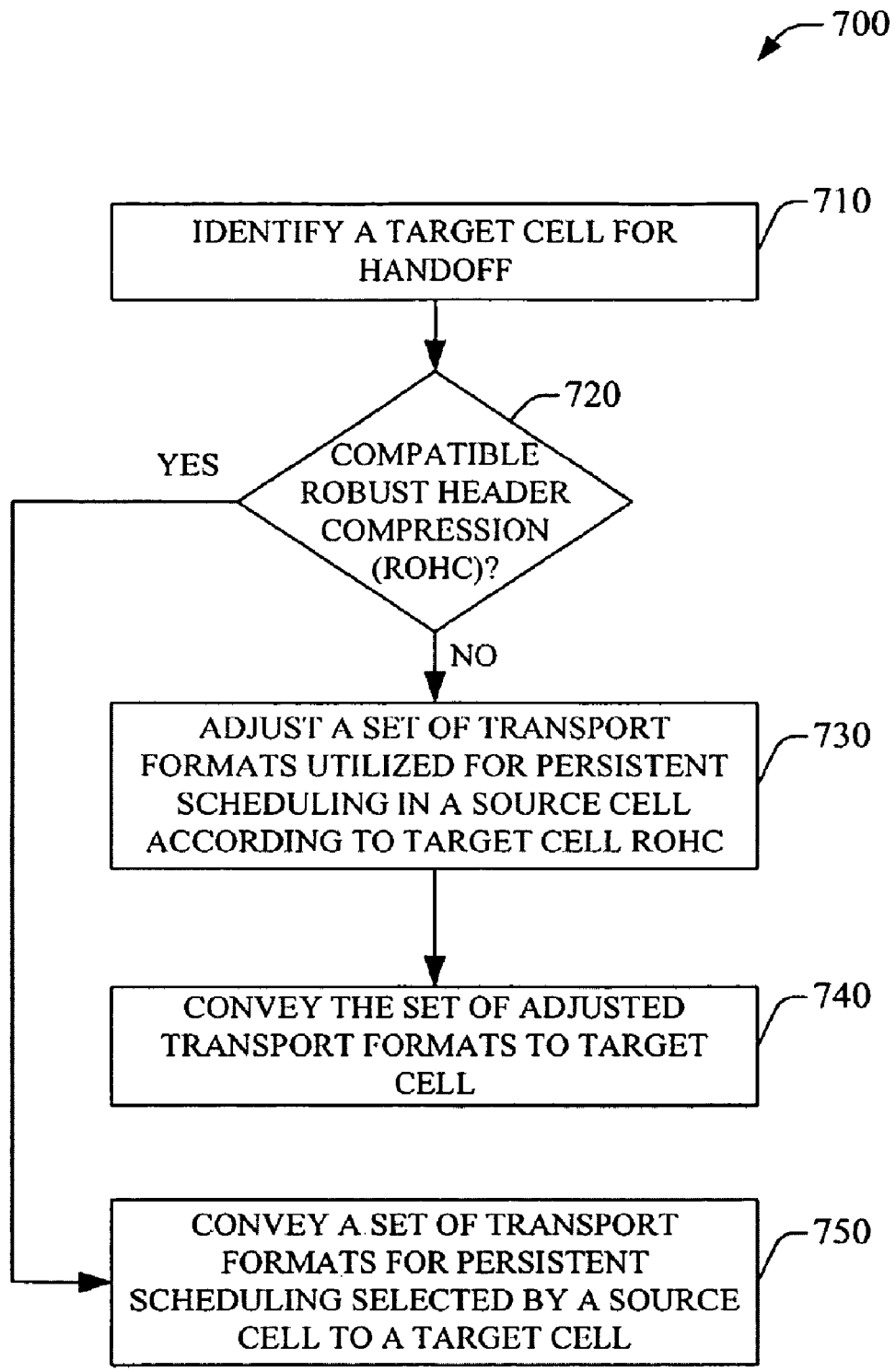
FIG. 7 presents a flowchart of an example method that exploits a learned transport format for semi-persistent scheduling at handoff from a source base station to a target base station in accordance with aspects described in the subject specification.

In view of the example systems presented and described above, methodologies for determining semi-persistent scheduling based on learning scheduling patterns that may be implemented in accordance with the disclosed subject matter will be better appreciated with reference to the flowcharts of FIGS. 5, 6, and 7. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ) Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 5A is a flowchart of an example method 500 to establish, and. utilize, semi-persistent scheduling. Method 500 can be exploited in a base station (e.g., eNode B 210) that operates in a packet-based (e.g., IP-packet based) network, and services wireless devices capable of receiving and processing (e.g., decoding) data packet of various formats. At act 510 a flow, or packetized data stream, is fully scheduled for a statically or dynamically configured time interval. In an aspect, dynamic configuration affords ceasing to schedule a data flow according to processing parameters associated with the scheduled flow (e.g., momenta of an accumulation distribution of scheduled packet sizes and inter-packet time interval.) In an aspect, such time interval can be determined by a network management component, e.g., an EPS gateway. In another aspect, a network component (e.g., scheduler 215)

can determine the time interval once the component deems a confidence metric, in a statistical sense, has attained a high value regarding parameters that characterize the scheduled packetized data stream. A magnitude of the time interval can range from several to hundreds of packet frames, which are typically consistent with radio frames utilized to convey modulated information over the air interface. In yet another aspect, time intervals can be inferred based on previously utilized time intervals.

At act 520, accumulation statistics of served packet sizes (S) and inter-packet time interval (T) are collected. In an aspect, collection of statistics refers to a systematic recording of {S, T} pairs and an associated analysis; generation of a pair distribution (e.g., a histogram) and computation of associated momenta (average, squared standard deviation, etc.) of the distribution, as well as identification of patterns, clustering characteristics, and so on. In addition, accumulation of statistics includes storing the accumulation statistics and results extracted, or learned, thereof in a memory (e.g., memory 245). Inter-packet time interval typically is associated to a rate of generation of packet frames; for example, a vocoder can generate VoIP frames every 20 ms. Such a rate, as well as a packet size S, is typically determined by a scheduler (e.g., scheduler 215) according to characteristics associated with the flow, like a size of a data packet queue, data payload, tolerable overhead which is directly associated with predetermined QoS parameters (e.g., guaranteed and minimum bit rates), sector load, sector throughput, etc.

At act 530 a set of peaks of highest accumulation, or set of maxima of distributions of {S, T} pairs, is identified. In an aspect, a single peak can be attributed to a periodic or aperiodic burst-like flow of data packets. Such identification typically relies on analysis of the accumulated statistics. At act 540, a characteristic of a distribution maximum is evaluated: If more that a predetermined percentage (P) of {S, T} pairs are distributed within a tolerance size D, then the distribution is bell-shaped and the flow can be efficiently scheduled via semi-persistent scheduling; the latter enacted in act 550. It should be appreciated that the magnitude of P and D can configured statically at a time of setting up a component that performs methodology 500. In addition, D can be inferred according to supplemental data associated with a communication network in which methodology 500 is implemented. For example, depending on flow, D can assume disparate values, which can reflect operational properties (e.g., antenna configuration, processor clock, frequency of operation of switched power sources) of a target terminal and/or subscription plan (e.g., premium user, average user, business user) operated by the terminal that receives the flow. When {S, T} pairs distribution fails to accommodate P percentage of pairs within D, semi-persistent scheduling is deemed not adequate and data flow remains scheduled in full for another predetermined time interval.

FIG. 5B is a flowchart of an example method 560 to establish, and utilize, semi-persistent scheduling. Example method 560 can be employed to complement example method 500 or as an alternative thereto. Acts 565 and 570 in example method 560 are substantially the same as, respectively, acts 510 and 526 in example method 500. In particular, at act 565 a flow, or packetized data stream, is fully scheduled for a statically or dynamically configured time interval. In an aspect, dynamic configuration affords ceasing to schedule a data flow according to processing parameters associated with the scheduled flow (e.g., momenta of an accumulation distribution of scheduled packet sizes and inter-packet time interval.) In an aspect, such time interval can be determined by a network management component, e.g., an EPS gateway. In another aspect, a network component (e.g., scheduler 215) can determine the time interval once the component deems a confidence metric, in a statistical sense, has attained a high value regarding parameters that characterize the scheduled packetized data stream. A magnitude of the time interval can range from several to hundreds of packet frames, which are typically consistent with radio frames utilized to convey modulated information over the air interface. In yet another aspect, time intervals can be inferred based on previously utilized time intervals.

At act 570, accumulation statistics of served packet sizes (S) and inter-packet time interval (T) are collected. In an aspect, collection of statistics refers to a systematic recording of {S, T} pairs and an associated analysis; generation of a pair distribution (e.g., a histogram) and computation of associated momenta (average, squared standard deviation, etc.) of the distribution, as well as identification of patterns, clustering characteristics, and so on. In addition, accumulation of statistics includes storing the accumulation statistics and results extracted, or learned, thereof in a memory (e.g., memory 245). Inter-packet time interval typically is associated to a rate of generation of packet frames; for example, a vocoder can generate VoIP frames every 20 ms. Such a rate, as well as a packet size S, is typically determined by a scheduler (e.g., scheduler 215) according to characteristics associated with the flow, like a size of a data packet queue, data payload, tolerable overhead which is directly associated with predetermined QoS parameters (e.g., guaranteed and minimum bit rates), sector load, sector throughput, etc.

At act 575 accumulated statistics for data packet sizes and inter-packet time intervals are contrasted with available "data-stream fingerprints" associated with specific data generators. Such fingerprints can include statistical parameters (mean, standard deviation, inter-packet time intervals and sizes, etc.), and transport formats as well, associated with a characteristics distribution of data packets as generated by a data generator, e.g., a vocoder. In an aspect, a set of data-stream fingerprints can be stored in a memory (e.g., memory 245) in an eNode B that schedules the data flow for an initial time interval. A positive comparison of accumulated statistics of a scheduled data flow results in utilizing semi-persisted scheduling; enacted in act 580. Conversely, flow is directed to act 565 and further statistics are accumulated.

FIG. 6 is a flowchart of an example method 600 for selecting transport formats suitable for semi-persistent scheduling. In an aspect, example method 600 can be employed concurrently with methodology 500. However, it should be appreciated that example method 600 can be utilized independently of substantially any other method. Act 610, recursively checks whether semi-persistent scheduling is in effect until there is an indication of such scheduling mechanism being active; for instance, act 550 of example method has been enacted and thus semi-persistent scheduling is implemented in a system that exploits both example methods 500 and 600. At act 620, a packet format is selected to accommodate a largest packet size within a tolerance, e.g., tolerance D of example method 500, of a transport format (e.g., {S, T}) with a highest accumulation statistics. At act 630, a semi-persistent scheduling time interval is selected. Such a selection can rely upon at least the following criteria. (i) Time interval is a smallest inter-packet time of size within a tolerance (e.g., D) from the transport format with the highest accumulation statistics. (ii) Time interval is maximum delay tolerated by a selected scheduled flow. Such maximum delay is typically conveyed by a label associated with a flow that is to be semi-persistently scheduled. (iii) Time interval is the reciprocal of a maximum packet loss rate. (iv) Semi-persistent scheduling time interval is a least common multiple of generation rates $\gamma_I = 1/T_I$, where I=1, 2, ... M, and $T_I$ are inter-packet time intervals associated with packets within the packet size tolerance. At act 640, a packet format, or transport block size (S), and a time interval (T) are selected so as to fulfill the relationship S×T≦ABR. It should be appreciated that such a selection can lead to data packets being segmented during transmission over the air-interface as the selected S can be smaller than a packet scheduled to be transmitted. It is to be appreciated that ABR is typically conveyed by a label associated with the flow to be semi-persistently scheduled. In addition, other bitrates like OBR can be employed as a bound for the S×T product.

At act 650, a packet formal and time interval can be selected jointly across a set of flows to be scheduled semi-persistently. In an aspect, such selection can entail an optimization of packet format and time interval based upon QoS metrics associated with the scheduled flow and conveyed in respective labels, the optimization facilitated by analyzer 225 through processor 235.

FIG. 7 presents a flowchart of an example method 700 that exploits a learned transport format for semi-persistent scheduling at handoff from a source base station to a target base station. At act 710 a target cell for handoff is identified. Identification can be based on downlink and/or uplink channel quality of a terminal (e.g., 260) being handed over with respect to a target cell. At act 720, it is checked whether a robust header compression (RoHC) in the target cell is compatible with the source cell. The checking act can be implemented through a backhaul communication network, based at least in part in authentication of a handshake-type exchange. In case an incompatibility is present, a set of transport formats (e.g., a set of packet size and inter-packet interval or generation rate associated with specific application (voice, videotelephony, file transfer(s)) utilized for semi-persistent scheduling in the source cell are adjusted according to target cell RoCH. Such adjustment is necessary to account for disparate compression experienced by a conveyed packet in flow in the target cell. Upon adjustment, the set of adjusted transport formats is conveyed to the identified target cell at act 740. In case there is compatibility among RoHCs in source and target cells, a set of transport formats for semi-persistent scheduling selected by the source cell are conveyed to the target cell.

Figure 8:
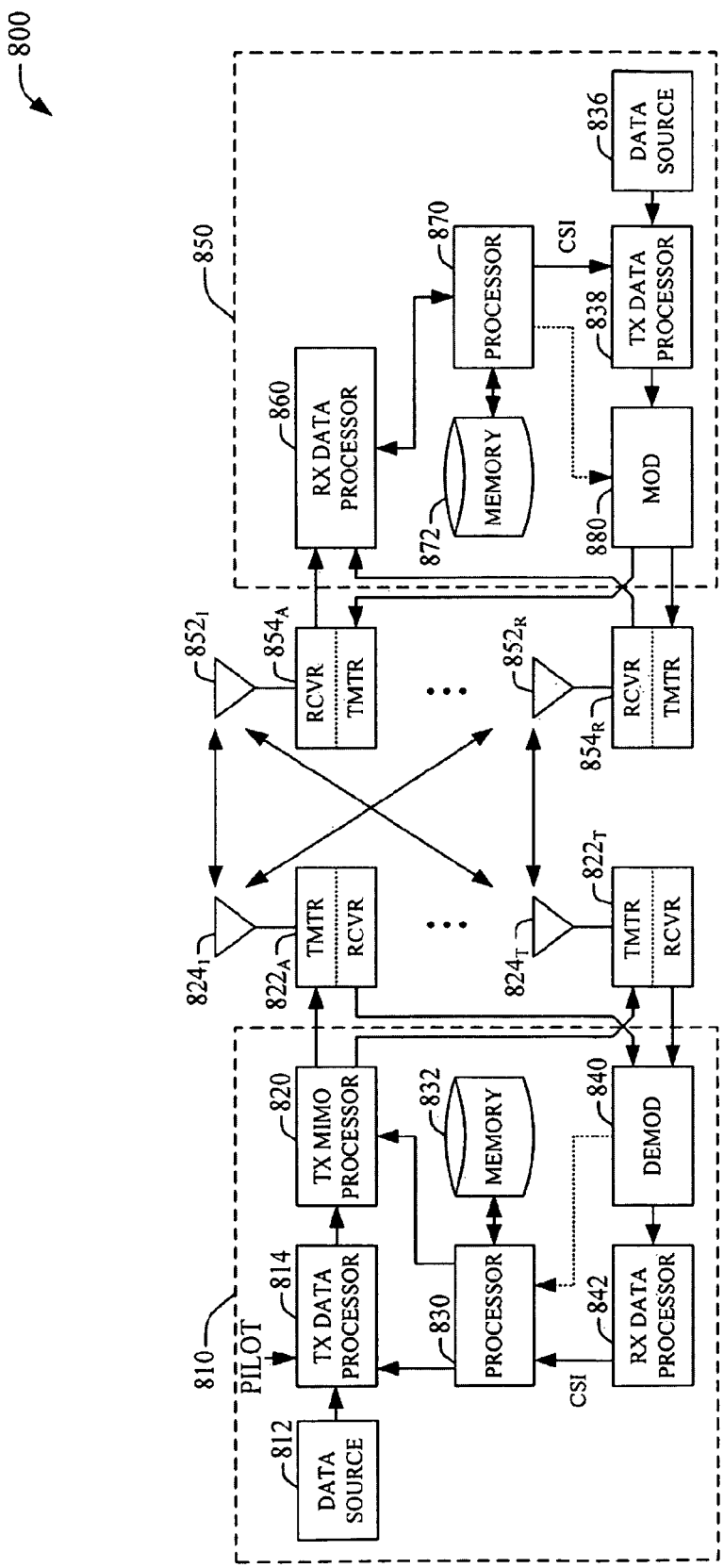
FIG. 8 is a block diagram of an embodiment of a transmitter system and a receiver system with MIMO operation capabilities that provide for cell/sector communication in accordance with aspects described in the subject description.

FIG. 8 is a block diagram 800 of an embodiment of a transmitter system 810 (such as eNode B 210, or base stations 110a, 110b, or 110c) and a receiver system 850 (e.g., access terminal 260) in a MIMO system that can provide for cell/sector communication in a wireless communication environment in accordance with one or more aspects set forth herein—e.g., generation, optimization, communication and decoding of synchronization sequences (e.g., P-SCH) can occur as described hereinbefore. At the transmitter system 810, traffic data for a number of data streams can be provided from a data source 812 to transmit (TX) data processor 814. In an embodiment, each data stream is transmitted over a respective transmit antenna. TX data processor 814 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g. symbol mapped) based on a particular modulation scheme (e.g., binary phase-shift keying (BPSK), quadrature phase-shift keying (QPSK), multiple phase-shift keying (M-PSK), or M-ary quadrature amplitude modulation (M-QAM)) selected for that data stream to provide modulation symbols. The data rate, coding, and modulation for each data stream may be determined by instructions executed by processor 830, the instructions as well as the data may be stored in memory 832. Processor 830 also executes instructions, stored on memory 832, that facilitate scheduling data packets for one or more packetized data streams, collecting statistics of scheduled packet format sizes and inter-packet time intervals, and extracting transport block sizes and inter-packet times for implementing, e.g., executing a set of instruction that affording utilization of, an efficient semi-persistent scheduling.

The modulation symbols for all data streams are then provided to a TX MIMO processor 820, which may further process the modulation symbols (e.g., OFDM). TX MIMO processor 820 then provides $N_T$ modulation symbol streams to $N_T$ transceiver (TMTR/RCVR) $822_A$ through $822_T$. In certain embodiments, TX MIMO processor 820 applies beamforming weights (or preceding) to the symbols of the data streams and to the antenna from which the symbol is being transmitted. Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $822_A$ through $822_T$ are then transmitted from $N_T$ antennas $824_I$ through $824_T$, respectively. At receiver system 850, the transmitted modulated signals are received by $N_R$ antennas $852_1$ through $852_R$ and the received signal from each antenna 852 is provided to a respective transceiver (RCVR/TMTR) $854_A$ through $854_R$. Each transceiver $854_I$-$854_R$ conditions (e.g., filters, amplifies, and downconverts) a respective received signal, digitizes the conditioned signal to provide samples, and further processes the samples to provide a corresponding "received" symbol stream.

An RX data processor 860 then receives and processes the $N_R$ received symbol streams from $N_R$ transceivers $854_1$-$854_R$ based on a particular receiver processing technique to provide $N_T$ "detected" symbol streams. The RX data processor 860 then demodulates, deinterleaves, and decodes each detected symbol stream to recover the traffic data for the data stream. The processing by RX data processor 860 is complementary to that performed by TX MIMO processor 820 and TX data processor 814 at transmitter system 810. A processor 870 periodically determines which pre-coding matrix to use, such a matrix can be stored in memory 872. Processor 870 formulates a reverse link message comprising a matrix index portion and a rank value portion. Memory 872 may store instructions that when executed by processor 870 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 838, which also receives traffic data for a number of data streams from a data source 836, modulated by a modulator 880, conditioned by transceiver $854_A$ through $854_R$, and transmitted back to transmitter system 810.

At transmitter system 810, the modulated signals from receiver system 850 are received by antennas $824_I$-$824_T$, conditioned by transceivers $822_A$-$822_T$, demodulated by a demodulator 840, and processed by a RX data processor 842 to extract the reserve link message transmitted by the receiver system 850. Processor 830 then determines which pre-coding matrix to use for determining the beamforming weights and processes the extracted message.

Single-user (SU) MIMO mode of operation corresponds to the case in which a single receiver system 850 communicates with transmitter system 810, as illustrated in FIG. 8 and according to the operation described above. It should be appreciated that in the subject mode of operation inter-cell power can be effected as described hereinbefore. In a SU-MIMO system, the $N_T$ transmitters 824$_1$-824$_T$ (also known as TX antennas) and $N_R$ receivers 852$_1$-852$_R$ (also known as RX antennas) form a matrix channel (e.g., Rayleigh channel, or Gaussian channel) for wireless communication. The SU-MIMO channel is generally described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to $\min\{N_T, N_R\}$. A MIMO channel formed by the $N_T$ transmit and $N_R$ receive antennas may be decomposed into $N_v$ independent channels, which are also referred to as spatial channels, where $N_v \leq \min\{N_T, N_R\}$. Each of the $N_v$ independent channels corresponds to a dimension or communication layer. Synchronization channel generator 215 can map a generated sequence, after modulation thereof, into the $N_v$ communication layers in which the MIMO channel can be decomposed. Processor 225 can perform a portion of the mapping.

In one aspect, transmitted/received symbols with OFDM, at tone ω, can be modeled by:

$$y(\omega) = \underline{H}(\omega) c(\omega) + n(\omega). \tag{1}$$

Here, $y(\omega)$ is the received data stream and is a $N_R \times 1$ vector, $H(\omega)$ is the channel response $N_R \times N_T$ matrix at tone ω (e.g., the Fourier transform of the time-dependent channel response matrix h), $c(\omega)$ is an $N_T \times 1$ output symbol vector, and $n(\omega)$ is an $N_R \times 1$ noise vector (e.g., additive white Gaussian noise). Precoding can convert a $N_v \times 1$ layer vector to $N_T \times 1$ precoding output vector. $N_v$ is the actual number of data streams (layers) transmitted by transmitter 810, and $N_v$ can be scheduled at the discretion of the transmitter (e.g., access point 250) based at least in part on channel conditions and the rank reported by the terminal. It should be appreciated that $c(\omega)$ is the result of at least one multiplexing scheme, and at least one pre-coding (or beamforming) scheme applied by the transmitter. Additionally, $c(\omega)$ is convoluted with a power gain matrix, which determines the amount of power transmitter 810 allocates to transmit each data stream $N_v$. It should be appreciated that such a power gain matrix can be a resource that is assigned to access terminal 240, and it can be managed through adjustment of power offsets as described herein. In view of the FL/RL reciprocity of the wireless channel, it should be appreciated that a transmission from MIMO receiver 850 can also be modeled in the fashion of Eq. (1), including substantially the same elements. In addition, receiver 850 can also apply pre-coding schemes prior to transmitting data in the reverse link. It should be appreciated that generation of optimized PSCs (e.g., 320$_1$, 320$_2$, or 320$_3$) precedes mapping of the generated sequence into an OFDM time-frequency resource block. As mentioned above, synchronization channel generator 215 can map a generated sequence, which can be conveyed in the manner described above.

In system 800 (FIG. 8), when $N_T = N_R = 1$, system 800 reduces to a single-input single-output (SISO) system that can provide for sector communication in a wireless communication environment in accordance with one or more aspects set forth herein. Alternatively, a single-input multiple output (SIMO) mode of operation corresponds to $N_T > 1$ and $N_R = 1$. Furthermore, when multiple receivers communicate with transmitter system 810, a multiuser (MU) MIMO mode of operation is established.

Next, a system that can enable aspects of the disclosed subject matter are described in connection with FIG. 9. Such system can include functional blocks, which can be functional blocks that represent functions implemented by a processor or an electronic machine, software, or combination thereof (e.g., firmware).

Figure 9:
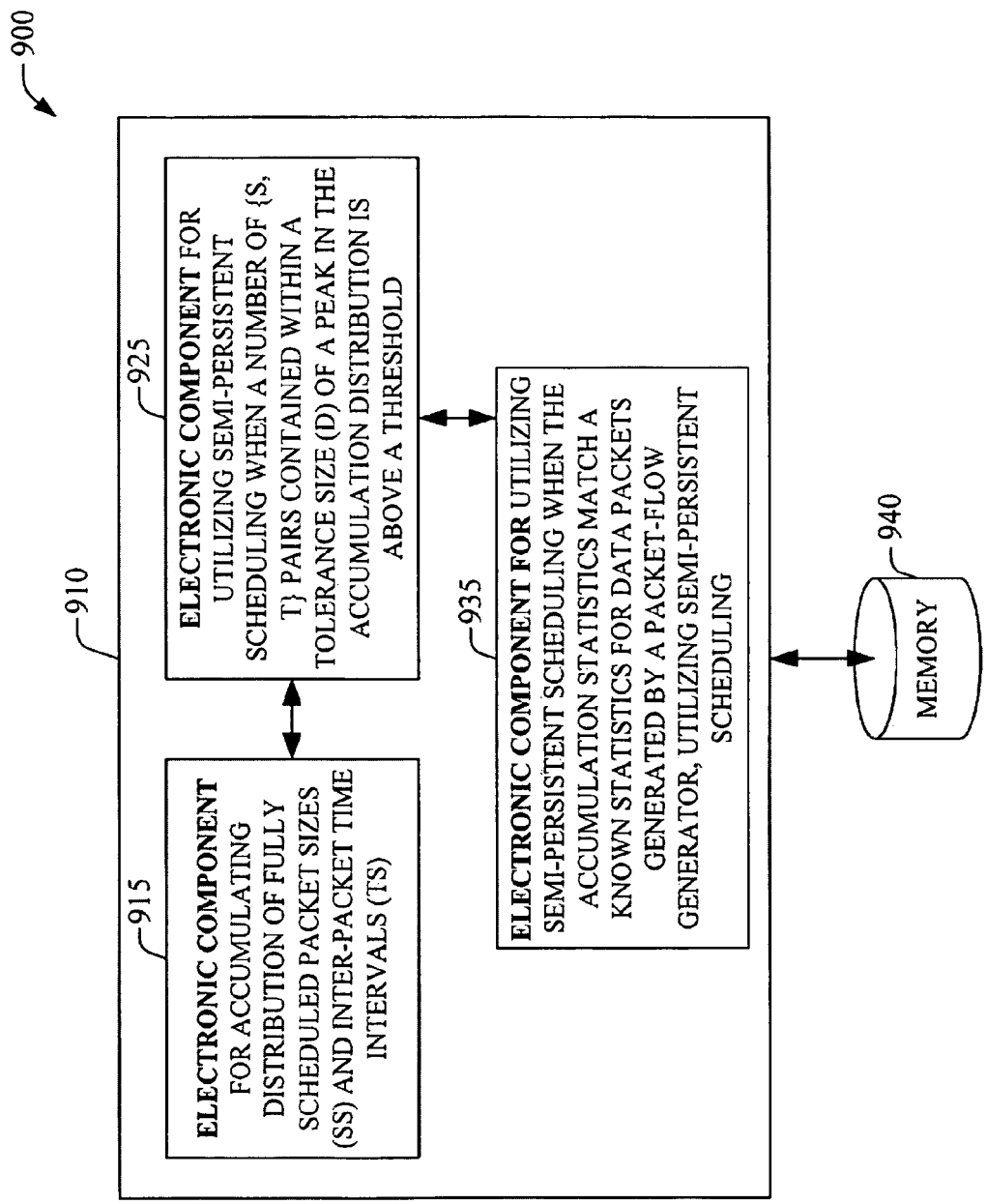
FIG. 9 is a block diagram of an example system that enables a learning approach to establishing and utilizing a persistent scheduling of one or more packetized data flows.

FIG. 9 is a block diagram of an example system that enables a learning approach to establishing and utilizing a persistent scheduling of one or more packetized data flows. System 900 can reside, at least partially, within a wireless base station (e.g., eNode B 210). System 900 includes a logical grouping 910 of electronic components that can act in conjunction. In an aspect, logical grouping 910 includes an electronic component 915 for accumulating distribution of fully scheduled packet sizes (Ss) and inter-packet time intervals (Ts); an electronic component 925 for utilizing semi-persistent scheduling when a number of {S, T} pairs contained within a tolerance size (D) of a peak in the accumulation distribution is above a threshold; and an electronic component 935 for utilizing semi-persistent scheduling when the accumulation statistics match a known statistics for data packets generated by a packet-flow generator, utilizing semi-persistent scheduling.

System 900 can also include a memory 940 that retains instructions for executing functions associated with electronic components 915, 925, and 935, as well as measured and computed data that may be generated during executing such functions. While shown as being external to memory 940, it is to be understood that one or more of electronic components 915, 925, and 935 can reside within memory 940.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture is intended to comprise, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to, these and any other suitable types of memory.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes," "including," "posses," "possessing," or variants thereof are used in either the detailed description or the claims, such terms are intended to be inclusive in a manner similar to the term "comprising" as "comprising" is interpreted when employed as a transitional word in a claim.

What is claimed is:

1. A method comprising:
   scheduling in full a packet flow during a specific period of time at a base station;
   collecting accumulation statistics of scheduled packet sizes (Ss) and inter-packet time intervals (Ts) by monitoring transmissions over a network between the base station and a user equipment (UE); and
   identifying a set of peaks of highest accumulation; when a number of $\{S, T\}$ pairs contained within a tolerance size (D) of the peak is above a threshold, utilizing semi-persistent scheduling.

2. The method of claim 1, further comprising: when the accumulation statistics match a known statistics for data packets generated by a packet-flow generator, utilizing semi-persistent scheduling.

3. The method of claim 2, utilizing semi-persistent scheduling further comprises selecting a packet format ($S_0$) to accommodate a largest packet size within the tolerance size D.

4. The method of claim 3, further comprising selecting as a semi-persistent scheduling time interval a smallest time interval among packets within the tolerance size.

5. The method of claim 3, further comprising selecting as a semi-persistent scheduling time interval a maximum delay tolerated by the scheduled packet flow.

6. The method of claim 3, further comprising selecting as a semi-persistent scheduling time interval a reciprocal of a maximum packet loss rate for the scheduled packet flow.

7. The method of claim 3, further comprising selecting as a semi-persistent scheduling time interval a least common multiple of a set of time interval for scheduled packet sizes within the tolerance size.

8. The method of claim 2, utilizing semi-persistent scheduling further comprises selecting a packet format ($S_0$) and a semi-persistent time interval ($T_0$) that satisfy $S_0 \times T_0 \leqq \rho$, wherein $\rho$ is one of an average bitrate or a guaranteed bitrate.

9. The method of claim 2, utilizing semi-persistent scheduling further comprises selecting a packet format and a semi-persistent time interval jointly across a set of fully scheduled packet flows.

10. The method of claim 9, wherein selecting a packet format and a semi-persistent time interval jointly across a set of fully scheduled packet flows includes optimizing the packet format and the time interval based at least in part upon quality of service metrics associated with the scheduled flow.

11. The method of claim 5, wherein a packet format resulting from a concatenation of $S_0$ and D, and $\tau$ comprise a transport format for semi-persistent scheduling of the packet flow, wherein $\tau$ is a semi-persistent time interval.

12. The method of claim 2, further comprising continuing scheduling in full a packet flow when a number of $\{S, T\}$ pairs contained within a tolerance size of the peak fails to be above the threshold.

13. The method of claim 12, identifying the set of peaks includes computing a set of momenta of the $\{S, T\}$ pairs accumulation statistics.

14. The method of claim 13, wherein the tolerance size equals a square root of the second momentum of the $\{S, T\}$ pairs accumulation statistics.

15. The method of claim 11, further comprising:
    storing a transport format; and
    conveying the transport format upon handover of the UE to a second base station.

16. The method of claim 15, conveying the transport format upon handover comprises communicating the transport over a backhaul communication network.

17. An apparatus that operates in a wireless communication system, the apparatus comprising:
    a processor configured to schedule in full a packet flow; to generate an accumulation distribution of scheduled packet sizes (Ss) and inter-packet time intervals (Ts); and when a number of $\{S, T\}$ pairs contained within a tolerance size (D) of a peak in the accumulation distribution is above a threshold, to implement semi-persistent scheduling; and
    a memory coupled to the processor.

18. The apparatus of claim 17, when the accumulation statistics match a statistics for data packets generated by a packet-flow generator, utilizing semi-persistent scheduling, the processor further configured to implement semi-persistent scheduling.

19. The apparatus of claim 18, wherein to implement semi-persistent scheduling comprises to select a packet format and a semi-persistent time interval jointly across a set of fully scheduled packet flows includes optimizing the packet format and the time interval based at least in part upon quality of service metrics associated with the scheduled flow and conveyed in respective flow labels.

20. The apparatus of claim 18, wherein to implement semi-persistent scheduling comprises to select a packet format ($S_0$) to accommodate a largest packet size within the tolerance size D.

21. The apparatus of claim 20, wherein to implement semi-persistent scheduling further comprises to select as a semi-persistent scheduling time interval a smallest time interval among packets within the tolerance size.

22. The apparatus of claim 20, wherein to implement semi-persistent scheduling further comprises to select as a semi-persistent scheduling time interval a least common multiple of a set of time interval for scheduled packet sizes within the tolerance size.

23. The apparatus of claim 20, wherein to implement semi-persistent scheduling comprises to select as a semi-persistent scheduling time interval one of a maximum delay tolerated by the scheduled packet flow or a maximum packet loss rate for the scheduled packet flow.

24. The apparatus of claim 23, wherein to implement semi-persistent scheduling comprises to select a packet format ($S_1$) and a semi-persistent time interval ($\tau$) that satisfy $S_1 \times \tau \leq R$, wherein R is one of an average bitrate or a guaranteed bitrate.

25. The apparatus of claim 24, wherein a packet format resulting from a concatenation of $S_0$ and D, and the semi-persistent time interval comprise a transport format for semi-persistent scheduling of the packet flow.

26. The apparatus of claim 18, the processor further configured to compute a set of momenta of the {S, T} pairs accumulation distribution to determine the distribution shape.

27. The apparatus of claim 26, wherein the memory stores the accumulation distribution of {S, T} pairs.

28. The apparatus of claim 18, wherein the memory stores a set of statistics for a set of data-packet flows generated by a set of data packet generators.

29. The apparatus of claim 26, the memory stores a set of transport formats for semi-persistent scheduling.

30. The apparatus of claim 29, the processor further configured to convey a stored transport format upon handover.

31. The apparatus of claim 30, wherein the stored transport format is conveyed over a backhaul communication network.

32. A wireless communication device comprising:
   means for accumulating distribution of fully scheduled packet sizes (Ss) and inter-packet time intervals (Ts);
   means for utilizing semi-persistent scheduling when a number of {S, T} pairs contained within a tolerance size (D) of a peak in the accumulation distribution is above a threshold; and
   means for utilizing semi-persistent scheduling when the accumulation statistics match a known statistics for data packets generated by a packet-flow generator, utilizing semi-persistent scheduling.

33. The device of claim 32, further comprising means for scheduling in full a packetized data flow.

34. The device of claim 33, wherein a packet format resulting from a concatenation of $S_0$ and D, and $\tau$ comprise a transport format for semi-persistent scheduling of the packet flow, wherein $S_0$ is a semi-persistent packet format and $\tau$ is a semi-persistent time interval.

35. The device of claim 33, further comprising means for storing a set of transport formats for semi-persistent scheduling.

36. A computer program product including a non-transitory computer-readable medium comprising:
   code for causing a computer to schedule in full a packet flow;
   code for causing a computer to collect accumulation statistics over a specific period of time of fully scheduled packet sizes (Ss) and inter-packet time intervals (Ts);
   code for causing a computer to identify a set of peaks of highest accumulation;
   code for causing a computer to implement semi-persistent scheduling when a number of {S, T} pairs contained within a tolerance size (D) of the peak is above a threshold.

37. The computer program product of claim 36, wherein the non-transitory computer-readable medium further includes code for causing a computer to implement semi-persistent scheduling when the accumulation statistics match a known statistics for data packets generated by a packet-flow generator, utilizing semi-persistent scheduling.

38. The computer program product of claim 37, wherein code for causing a computer to implement semi-persistent scheduling includes code for causing the computer to select a semi-persistent packet format ($S_0$) and a semi-persistent scheduling time interval ($T_0$).

39. The computer program product of claim 37, wherein $S_0$ accommodates a largest packet size within the tolerance size D.

40. The computer program product of claim 38, wherein $S_0 \times T_0 \leq R$, with R being one of an average bitrate or a guaranteed bitrate.

41. The computer program product of claim 38, wherein $T_0$ is a smallest time interval among packets within the tolerance size.

42. The computer program product of claim 38, wherein $T_0$ is a maximum delay tolerated by the scheduled packet flow, wherein the maximum delay is conveyed by a flow label.

43. The computer program product of claim 42, wherein $T_0$ is a reciprocal of a maximum packet loss rate for the scheduled packet flow, wherein the maximum packet loss rate is conveyed by a flow label.

44. The computer program product of claim 38, wherein the non-transitory computer-readable medium further comprises code for causing a computer to concatenate So and D.

45. The computer program product of claim 38, wherein the concatenation of So and D, and $\tau$ comprise a transport format for semi-persistent scheduling of the packet flow, wherein $\tau$ is a semi-persistent time interval.

46. The computer program product of claim 36, wherein the code for causing a computer to identify a set of peaks of highest accumulation includes code for causing the computer to compute a set of momenta of the {S, T} pairs accumulation statistics to determine an accumulation distribution shape.

* * * * *